J. B. Cornell.
Vault Cover.
N° 14,281.  Patented Feb. 19, 1856.
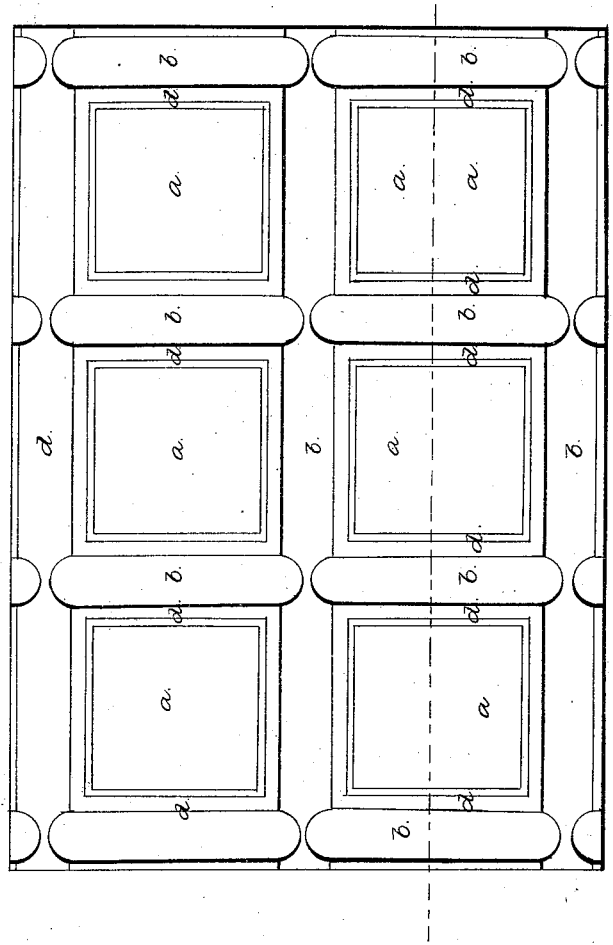
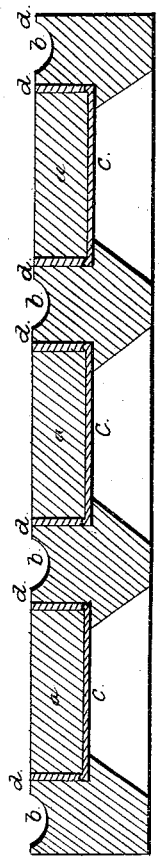

UNITED STATES PATENT OFFICE.

JOHN B. CORNELL, OF NEW YORK, N. Y.

VAULT-COVER.

Specification forming part of Letters Patent No. 14,281, dated February 19, 1856; Reissued March 24, 1857, No. 441.

*To all whom it may concern:*

Be it known that I, JOHN B. CORNELL, of the city, county, and State of New York, have invented a new and Improved Illuminating-Cover for Openings in Pavements, Floors, &c.; and I do hereby declare that the following is a full and exact description thereof, reference being had to the accompanying drawings, making a part of this specification, Figure 1, being a top view, and Fig. 2 a vertical section.

My improved illuminating cover is composed of flat faced panes of glass $a$, $a$, combined with a frame whose sides and cross bars have grooves $b$, $b$, in their upper surfaces, substantially as represented in the accompanying drawings. The panes $a$, $a$, of glass are secured in their positions by first embedding them in layers $c$, $c$, of putty, in such a manner as to bring their surfaces flush with the upper faces $d$, $d$, of the bars of the metallic frame, and then pouring melted brimstone into the spaces between the edges of the panes of glass and the adjacent sides of the bars. Or they may be secured in their positions in any other suitable manner.

It will be perceived that the faces of the panes of glass in my illuminating cover, being in the same plane with the upper surfaces of the bars in the metallic frame that receives them, will generally be kept clean by the friction of passing feet, and that it will be impossible for any considerable quantity of dirt to accumulate upon them. It will also be perceived that a light shower will remove all the dirt from the faces of the panes of glass into the gutters $b$, $b$, which surround them, where it will freely flow off and leave all parts of the cover clean. It will also be seen that the water cannot stand upon the joints between the panes of glass and the bars of the metallic frame, and consequently it will be impossible for water to find its way through the said illuminating cover, or for the joints to be injured by the formation of ice within or about them.

In point of illuminating power, and safety against the entrance of moisture, I believe that my improved illuminating cover for openings in pavements &c. has no equal.

Having fully described my improved illuminating cover for openings in pavements, &c., what I claim therein as new and desire to secure by Letters Patent, is—

The flat faced panes of glass secured in positions that bring their exposed surfaces flush or a little above the upper faces of the bars of the metallic frame, when the said bars have grooves between their said upper faces which form gutters around the panes of glass, for the purposes herein set forth.

The above specification of my new and useful improvement in illuminating covers for openings in floors and pavements, signed and witnessed this 28th day of February 1855.

JOHN B. CORNELL.

Witnesses:
  Z. C. ROBBINS,
  GEO. W. ADAMS.

[FIRST PRINTED 1912.]